United States Patent [19]
Kimura et al.

[11] Patent Number: 5,527,236
[45] Date of Patent: Jun. 18, 1996

[54] SHIFT CONTROL SYSTEM FOR AUTOMATIC TRANSMISSION

[75] Inventors: Hiromichi Kimura, Okazaki; Hidehiro Oba, Aichi-ken; Akira Fukatsu, Anjo; Akitomo Suzuki, Takahama, all of Japan

[73] Assignees: Toyota Jidosha Kabushiki Kaisha, Toyota; Aishin AW Co., Ltd., Anjo, both of Japan

[21] Appl. No.: 253,777

[22] Filed: Jun. 3, 1994

[30] Foreign Application Priority Data

Jun. 3, 1993 [JP] Japan .................................. 5-157990

[51] Int. Cl.$^6$ .................................................. B60K 41/06
[52] U.S. Cl. ............................................ 477/131; 477/156
[58] Field of Search ................................... 477/130, 131, 477/154, 155, 156

[56] References Cited

U.S. PATENT DOCUMENTS

| | | | |
|---|---|---|---|
| 3,831,465 | 8/1974 | Murakami | 477/154 |
| 4,282,781 | 8/1981 | Iwanaga et al. | 477/156 X |
| 4,836,057 | 6/1989 | Asayama et al. | 477/155 X |
| 4,845,618 | 7/1989 | Narita | 477/154 X |
| 4,846,021 | 7/1989 | Hamano et al. | 477/155 X |
| 4,882,952 | 11/1989 | Kashihara et al. | 477/155 X |
| 4,893,527 | 1/1990 | Furusawa et al. | 477/155 |
| 4,930,375 | 6/1990 | Yamamoto et al. | 477/155 X |
| 5,179,875 | 1/1993 | Brown | 477/155 X |

FOREIGN PATENT DOCUMENTS

| | | | |
|---|---|---|---|
| 58-077956 | 5/1983 | Japan | 477/156 |
| 61-018527 | 1/1986 | Japan | 477/156 |
| 62-261747 | 11/1987 | Japan . | |
| 1-224553 | 9/1989 | Japan . | |
| 2-46358 | 2/1990 | Japan . | |
| 3292458 | 12/1991 | Japan | 477/155 |

OTHER PUBLICATIONS

SAE 890529, pp. 45–53, Maurice B. Leising, et al., "The All–Adaptive Controls for the Chrysler Ultradrive Transaxle".

SAE 890528, pp. 167–183, Berthold Martin, et al., "The Chrysler A–604 Ultradrive 4–Speed Automatic Transaxle".

*Primary Examiner*—Khoi Q. Ta
*Assistant Examiner*—Nathan O. Jensen
*Attorney, Agent, or Firm*—Oblon, Spivak, McClelland, Maier & Neustadt

[57] ABSTRACT

A shift control system for an automatic transmission including frictional engagement elements to be applied by actuating a piston by an oil pressure. The shift control system comprises: a pressure regulating valve for regulating the oil pressure to be fed to the frictional engagement elements and for controlling the regulated pressure level; a shift detector for detecting a shift to be executed by feeding the oil pressure to the frictional engagement elements; a low-pressure standby unit for setting the regulated pressure level of the pressure regulator valve to such a value during a predetermined time period after the shift has been detected that the oil pressure to be fed to the frictional engagement elements moves only the piston; and a booster for controlling the regulated pressure level so that the oil pressure to be fed to the frictional engagement elements may gradually increase after lapse of the predetermined time period.

15 Claims, 9 Drawing Sheets

| | C0 | C1 | C2 | B0 | B1 | B2 | B3 | B4 | F0 | F1 | F2 |
|---|---|---|---|---|---|---|---|---|---|---|---|
| N | | | | ◌ | | | | | | | |
| REV. | | | O | O | | | | O | | | |
| 1ST | O | O | | | | | | ● | O | | O |
| 2ND | ● | O | | | | | O | | O | | |
| 3RD | O | O | | | ● | O | | | O | O | |
| 4TH | O | O | O | | | △ | | | O | | |
| 5TH | | O | O | O | | △ | | | | | |

PRIOR ART

FIG.10

PRIOR ART

SHIFT CONTROL SYSTEM FOR AUTOMATIC TRANSMISSION

BACKGROUND OF THE INVENTION

The present invention relates to a system for controlling the shift of an automatic transmission and, more particularly, to a shift control system for controlling an oil pressure to be fed to frictional engagement means directly by a pressure regulator valve at a shifting time.

As is well known in the art, an automatic transmission for vehicles is constructed to change power transmission paths in a gear train to execute a shift by applying/releasing frictional engagement means including clutches and brakes. Since the shifting operation is followed by rotational fluctuations of the rotary elements including the engine, the output shaft torque is abruptly changed to cause a shifting shock thereby to deteriorate the riding comfortableness, if the frictional engagement means is abruptly applied or released. In the case of the so-called "clutch-to-clutch shift", in which a predetermined frictional engagement means is released whereas another is applied, the engine will be either blown up or tied up to lower the output shaft torque and the durability of the frictional engagement means if the applying or releasing timing is improper.

In the prior art, the engaging pressure of the frictional engagement means for absorbing the inertial energy accompanying the rotational fluctuations of the rotary elements is gradually augmented according to the characteristics of an accumulator by attaching this accumulator to the frictional engagement means.

Figure 9:
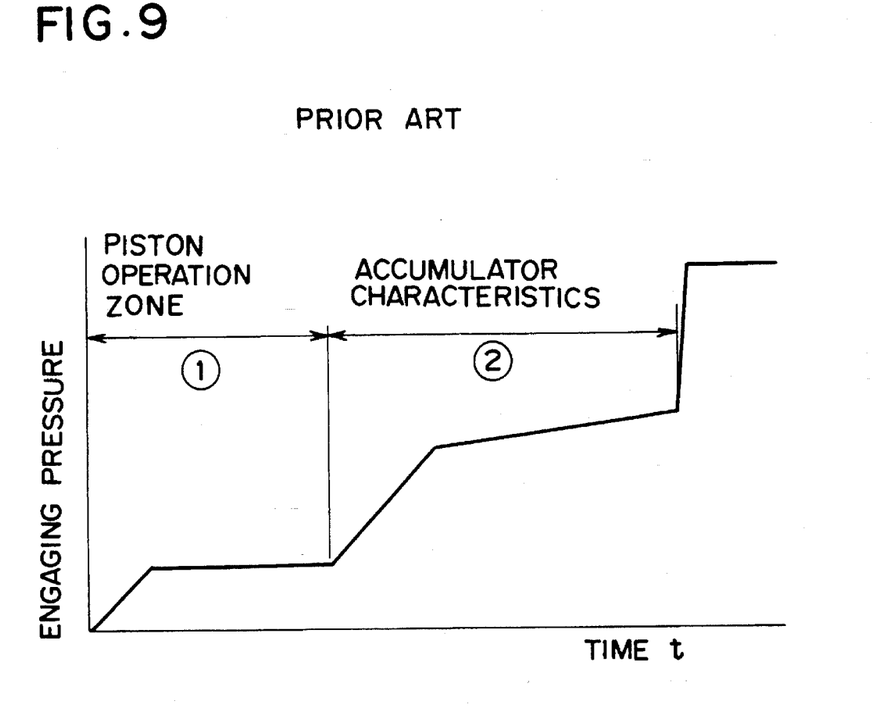
FIG. 9 is a diagram plotting the change in the engaging pressure in case an accumulator is used.

The oil pressure for applying the frictional engagement means equipped with the accumulator will change, as illustrated in FIG. 9. For time period ① after the feed of oil pressure is started, the piston of a hydraulic servo mechanism operates and advances to reduce the pack clearance. For subsequent time period ②, the oil pressure rises according to the characteristics of the accumulator so that the torque capacity of the frictional engagement means gradually increases.

Figure 10:
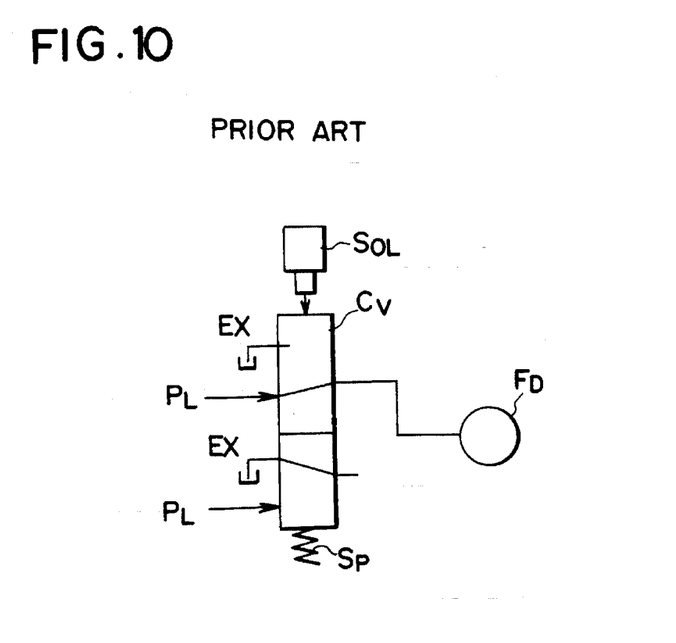
FIG. 10 is a conceptional diagram showing a system for controlling the engaging pressure of a frictional engagement system directly with a pressure regulator valve.

If such accumulator is used, the frictional engagement means comes into gradual engagement, as described above, so that the inertial energy can be absorbed by the slipping actions of the frictional elements to effect a smooth shift. However, the accumulator having such action is required to have a considerable capacity of oil. For reducing the size and weight of the hydraulic control system, it is desired to control the engaging pressure of the frictional engagement means directly by a pressure regulator valve in place of the accumulator. This desirable control system is schematically shown in FIG. 10. According to this system, a pressure regulator valve CV for regulating the engaging pressure of frictional engagement means FD including clutches and brakes sets a regulated pressure level in accordance with the elastic force of a spring SP and a signal pressure coming from a linear solenoid valve or duty solenoid valve SOL and regulates a line pressure PL according to the regulated pressure level. The line pressure PL thus regulated is fed to the frictional engagement means FD.

In the construction shown in FIG. 10, the regulated pressure level is so controlled according to the signal pressure of the solenoid valve SOL that the oil pressure to be fed to the frictional engagement means may gradually rise via the aforementioned piston operation zone. As a matter of fact, the parts of the frictional engagement means have production dispersions in the stroke of its piston or in the load of its return spring. As a result, the control of the oil pressure in the piston operation zone may become improper to cause a surge (or overshoot) in the engaging pressure so that the shifting shock may grow more and more serious.

Figure 11A:
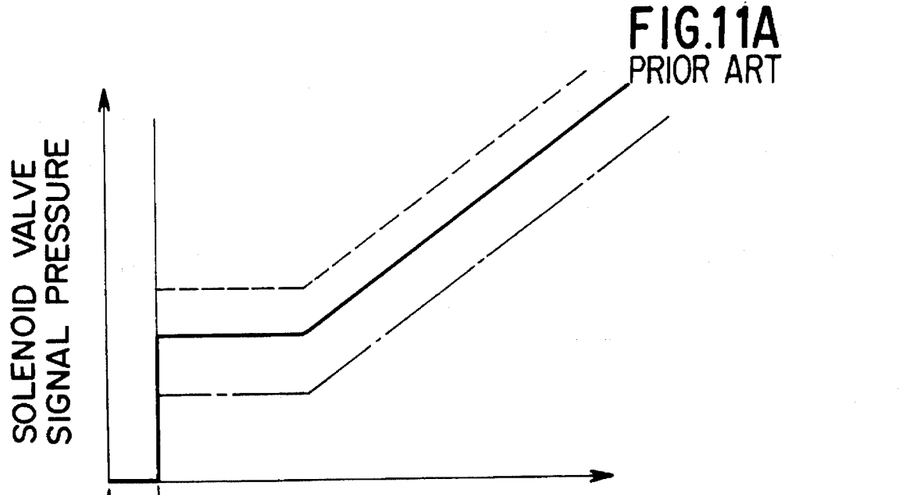
FIG. 11 is a time chart illustrating the situation in which a surge occurs in case the engaging pressure of the frictional engagement system is regulated by the pressure regulator valve.
Figure 11B:
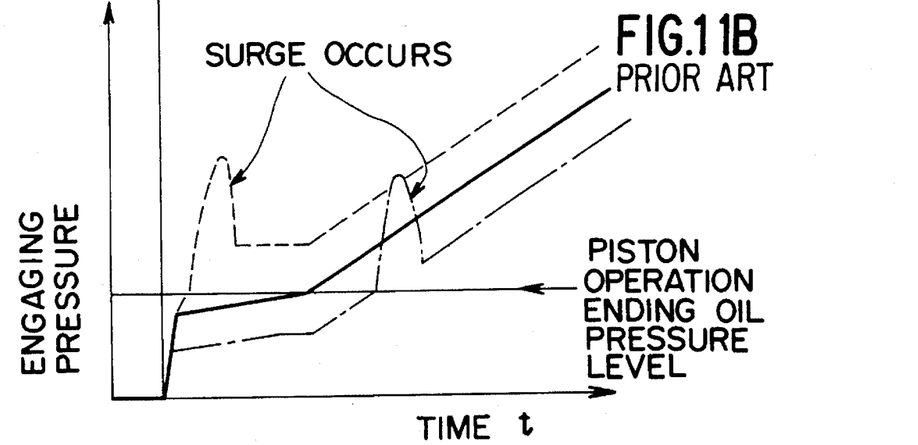

This will be specifically described in the following. The surge occurs when the piston reaches its stroke end, if the piston has such a dispersion that it will instantly complete its operation, as experienced in case the regulated pressure level of the pressure regulator valve deviates to a higher value, in case the piston stroke becomes shorter than a predetermined value, or in case the load of the return spring deviates to a lower level. Specifically, the effective area between a feed port of the line pressure in the pressure regulator valve and an output port to the frictional engagement means takes a large value when the engaging pressure is lower (allowing the oil to flow continuously) than the line pressure. If, in this state, the piston reaches its stroke end to interrupt the oil feed abruptly, a high flow of oil is abruptly interrupted because the effective area of the pressure regulator valve is not quickly reduced. As a result, the surge occurs in the engaging pressure. This behavior is illustrated in FIG. 11, in case the regulated pressure level is higher than that of the normal state. In FIG. 11, solid lines indicate the normal state. In case the regulated pressure level is higher, as indicated by broken lines, the surge occurs while the control belongs to the piston operation zone.

On the contrary, in the case of production dispersions in which the engaging pressure is gradually increased (or swept up) on or before the end of the piston operation, there arises the following phenomenon. Here, the production dispersions are experienced in case the regulated pressure level is lower than the predetermined value, in case the piston stroke is longer than the predetermined value, or in case the load of the return spring is higher than the predetermined value. The sweep-up of the engaging pressure is a control for raising the signal pressure of the solenoid valve SOL gradually to increase the engaging pressure accordingly gradually so as to establish the aforementioned accumulator characteristics. Unless the piston has finished its operation when the sweep-up is started, the oil continues flows into the chamber of the hydraulic servo mechanism so that the pressure regulator valve CV has its effective area increased, as in the foregoing cases. If, in this case, the piston reaches its stroke end, the flow of much oil is abruptly interrupted to cause the surge. This behavior is indicated by single-dotted lines in FIG. 11, in case the regulated pressure level is lower than the predetermined value.

SUMMARY OF THE INVENTION

A main object of the present invention is to provide a shift control system capable of controlling the engaging pressure of frictional engagement means directly without using any accumulator and preventing any surge of the engaging pressure.

Another object of the present invention is to provide a hydraulic mechanism rapable of controlling the engaging pressure of the frictional engagement means directly without causing any surge.

Still another object of the present invention is to prevent any delay in response when the engaging pressure of the frictional engagement means is to be directly controlled.

In order to achieve these objects, according to the present invention, there is provided a shift control system for an automatic transmission including frictional engagement means to be applied by actuating a piston by an oil pressure, comprising: a pressure regulating valve for regulating the oil pressure to be fed to said frictional engagement means and for controlling the regulated pressure level; shift detecting means for detecting a shift to be executed by feeding the oil pressure to said frictional engagement means; low-pressure standby means for setting the regulated pressure level of said pressure regulator valve to such a value during a predetermined time period after said shift has been detected that the oil pressure to be fed to said frictional engagement means moves only said piston; and booster means for controlling the regulated pressure level so that the oil pressure to be fed to said frictional engagement means may gradually increase after lapse of said predetermined time period.

As a result, the engaging pressure of the frictional engagement means is directly controlled by the pressure regulator valve to such a low value at the start of the control that only the piston is allowed to move. Thus, no surge occurs in this state even if the piston moves to its stroke end. Moreover, since the engaging pressure is then boosted, what occurs is that the force for pushing the frictional engagement means increases without any movement of the piston, so that the surge can hardly occur.

According to the shift control system of the present invention, the rising gradient of the engaging pressure is increased till the start of the inertial phase, in case the engaging pressure is raised after its low-pressure standby. After this, the rising gradient of the engaging pressure is decreased so that the delay in the response to the control can be prevented together with the shifting shock.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 7 is executed;

DETAILED DESCRIPTION OF THE PREFERRED EMBODIMENT

Figure 1:
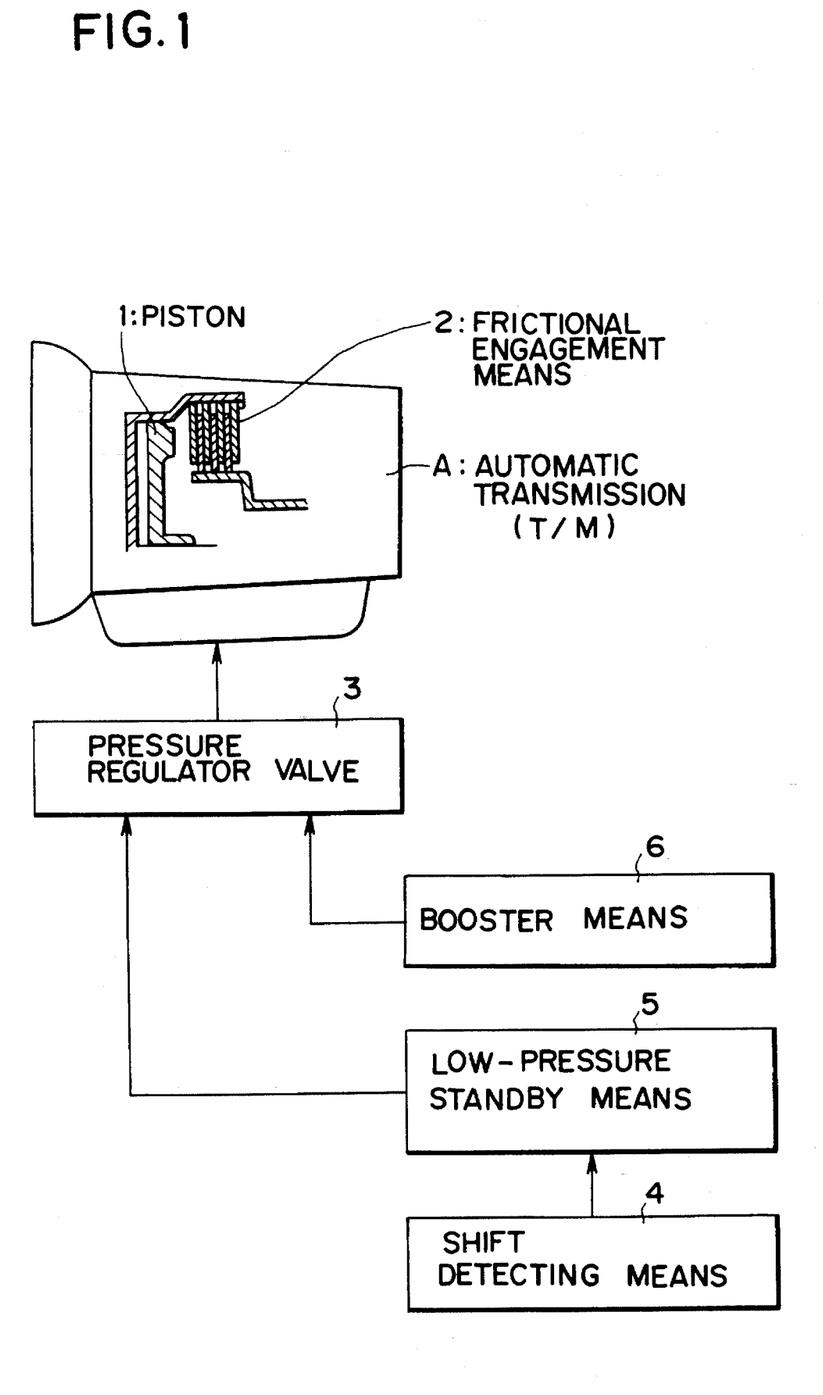
FIG. 1 is a block diagram showing the present invention conceptionally.

FIG. 1 shows a control system of the present invention schematically with functional means. The shift control system, as shown in FIG. 1, is used for an automatic transmission A which is equipped with frictional engagement means 2 to be brought into engagement by a piston 1. This shift control system is constructed to comprise: a pressure regulator valve 3 for regulating an oil pressure to be fed to the frictional engagement means 2 and controlling the regulated pressure level; shift detecting means 4 for detecting a shift to be executed by feeding the oil pressure to the frictional engagement means 2; low-pressure standby means 5 for setting the regulated pressure level of the pressure regulator valve 3 to such a level for a predetermined time period after said shift has been detected that the oil pressure to be fed to the frictional engagement means 2 may be lower than a pressure level for moving the piston 1 only; and booster means 6 for controlling the regulated pressure level so that the oil pressure to be fed to the frictional engagement means 2 may gradually rise after lapse of the aforementioned predetermined time period.

The aforementioned pressure regulator valve 3 may be constructed to include an elastic member for setting a regulated pressure level, and a signal pressure input unit for varying the regulated pressure level. The aforementioned low-pressure standby means 5 may be constructed to feed said signal pressure input unit with a signal pressure lower than the elastic force of the elastic member for the above-specified predetermined time period.

The shift control system can further comprise means for detecting start of an inertial phase during the aforementioned shift, and the aforementioned booster means 6 may control the aforementioned regulated pressure level so that the increasing gradients of the oil pressure to be fed to the aforementioned frictional engagement means 2 may be different before and after the start of the inertial phase.

In the automatic transmission A, to which is applied the present invention, the oil pressure to be fed to the frictional engagement means 2 is directly controlled by the pressure regulator valve 3. The regulated pressure level in the pressure regulator valve 3 is varied according to the situation of the shift. Specifically, low pressure standby means 5 sets the regulated pressure level of the pressure regulator valve 3 to a low value when a shift for applying the frictional engagement means 2 is detected by the shift detecting means 4. More specifically, the regulated pressure level is so set that the oil pressure to be fed to the frictional engagement means 2 may be as low as to move the aforementioned piston 1 only. After a predetermined time period of such a low-pressure state, the booster means 6 controls the regulated pressure level to increase the engaging pressure of the frictional engagement means 2 gradually. As a result, in the end region of the operation of the piston 1, the engaging pressure is maintained at a sufficiently low level that any surge occurs. Nor occurs the surge at a sweep-up because the engaging pressure is not swept up before the end of the piston operation.

On the other hand, if the pressure regulator valve 3 is exemplified by a value for setting the regulated pressure level in accordance with the elastic force of an elastic member and a signal pressure and if the signal pressure to be outputted by the low-pressure standby means 5 is not higher than the elastic force of the elastic member for the aforementioned predetermined time period, the regulated pressure level for this period takes a such a value as is determined by the elastic force of the elastic member. Thus, this elastic force can be relatively easily set according to the ending pressure of the piston pressure so that the engaging pressure in the piston operation region is set highly accurately.

Moreover, the shift responsiveness can be improved if the regulated pressure level is controlled to make the increasing gradient of the engaging pressure of the frictional engagement means different before and after the start of the inertial phase, that is, if the gradient is increased on and before the start of the inertial phase and decreased after the same.

Figure 2:
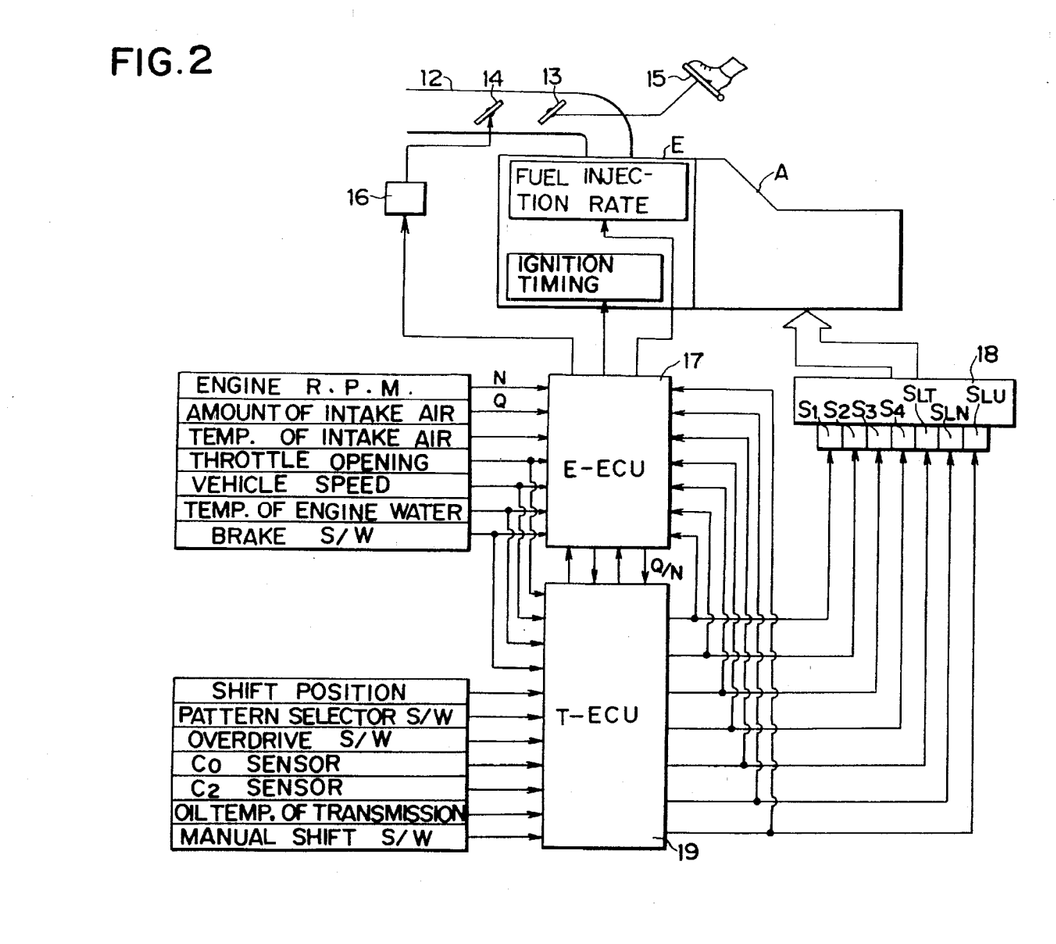
FIG. 2 is a block diagram schematically showing a control system according to one embodiment of the present invention.

Here will be more specifically described an embodiment of the present invention. In FIG. 2, an engine E connected to the automatic transmission A is equipped in its intake pipe 12 with a main throttle valve 13 and a sub-throttle valve 14 located upstream of the former. The main throttle valve 13 is so connected to an accelerator pedal 15 that it is controlled according to the depression of the accelerator pedal 15. On the other hand, the sub-throttle valve 14 is controlled by a motor 16. There is provided an engine electronic control unit (E-ECU) 17 for controlling the motor 16 to regulate the opening that sub-throttle valve 14 and for controlling the fuel injection rate and the ignition timing of the engine E. This electronic control unit 17 is composed mainly of a central processing unit (CPU), memory units (RAM and ROM) and an input/output interface and is fed as control data with a variety of signals including an engine (E/G) R.P.M. N, an amount Q of intake air, a temperature of intake air, a throttle opening, a vehicle speed, a temperature of engine water and a brake switch.

In the automatic transmission A, a hydraulic control unit 18 controls the shift, a lockup clutch, a line pressure and/or an engaging pressure of a predetermined frictional engagement means. The hydraulic control unit 18 is so constructed as to be electrically controlled and is equipped with: first to third shift solenoid valves S1 to S8 for executing the shift; a fourth solenoid valve S4 for controlling an engine braking state; a linear solenoid valve SLT for controlling the line pressure; a linear solenoid valve SLN for controlling an accumulator back pressure; and a linear solenoid valve SLU for controlling the engaging pressure of the lockup clutch or a predetermined frictional engagement means.

There is further provided an automatic transmission electronic control unit (T-ECU) 19 for controlling the shift, the line pressure and/or the accumulator back pressure by outputting signals to those solenoid valves. This electronic control unit 19 is composed mainly of a central processing unit (CPU), memory units (RAM and ROM) and an input/output interface and is fed as the control data with the throttle opening, the vehicle speed, the engine water temperature, the brake switch signal, a shift position signal, a pattern select switch signal, an overdrive switch signal, a signal coming from a C0 sensor for detecting the R.P.M. of a later-described clutch C0, a signal coming from a C2 sensor for detecting the R.P.M. of a later-described second clutch C2, an oil temperature of the automatic transmission and a signal of a manual shift: switch.

Moreover, the automatic transmission electronic control unit 19 and the engine electronic control unit 17 are connected with each other for data communications. Specifically, signals such as a signal of an amount (Q/N) of intake air per revolution are sent from the engine electronic control unit 17 to the automatic transmission electronic control unit 19, whereas signals such as a signal equivalent to a command signal for each solenoid valve or a signal for commanding a gear stage are sent from the automatic transmission electronic control unit 19 to the engine electronic control unit 17.

More specifically, the automatic transmission electronic control unit 19 decides the gear stage, the ON/OFF of the lockup clutch, or the regulated pressure level of the line pressure or the engaging pressure on the basis of the data inputted and the map stored in advance and outputs a command signal to a predetermined solenoid valve on the basis of the decision result to decide a failure or perform a control based on the decision. 011 the other hand, the engine electronic control unit 17 not only controls the fuel injection rate, the ignition timing and/or the opening of the sub-throttle valve 14 on the basis of the data inputted but also lowers the output torque temporarily by reducing the fuel injection rate at the shifting time of the automatic transmission A, by changing the ignition timing and/or by throttling the opening of the sub-throttle valve 14.

Figure 3:
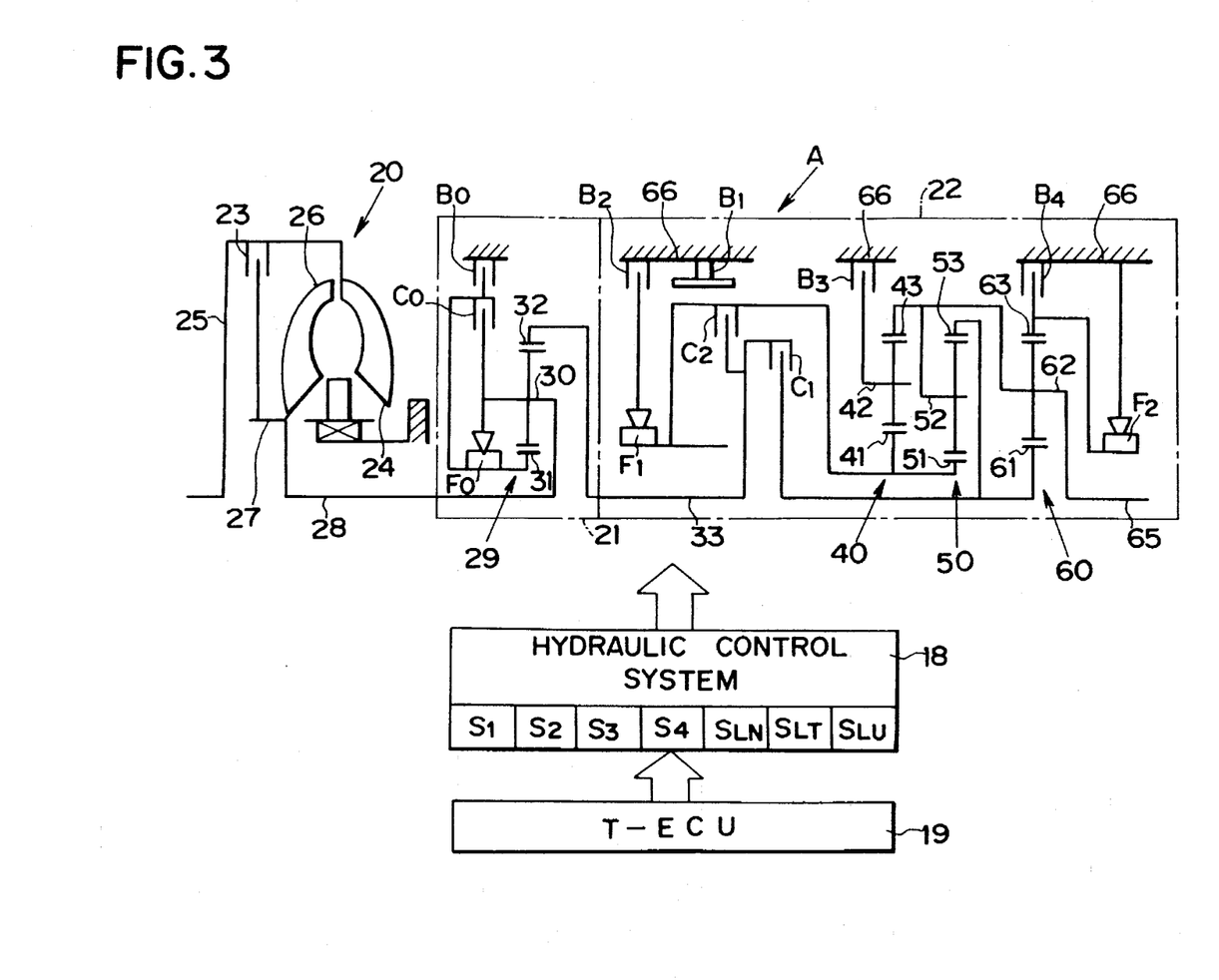
FIG. 3 is a diagram mainly showing a gear train of an automatic transmission for the control system.

FIG. 3 is a diagram showing one embodiment of the gear train of the automatic transmission A described above. As shown, the gear train is constructed to set five forward and one reverse gear stages. Specifically, the automatic transmission A is constructed of a torque converter 20, an auxiliary transmission unit 21 and a main transmission unit 22. The torque converter 20 is equipped with a lockup clutch 23 which is interposed between a front cover 25 integrated with a pump impeller 24 and a member (or hub) 27 integrated with a turbine runner 26. The engine has its crankshaft (although both are not shown) connected to the front cover 25, and an input shaft 28 having the turbine runner 26 connected thereto is connected to a earlier 30 of an overdrive planetary gear mechanism 28 constituting the auxiliary transmission unit 21.

Between the carrier 30 and a sun gear 31 of the planetary gear mechanism 29, there are interposed the multi-disc clutch C0 and a one-way clutch F0. Incidentally, this one-way clutch F0 is applied in case the sun gear 31 rotates forward (i.e., in the rotating direction of the input shaft 28) relative to the earlier 30. There is also provided a multi-disc brake B0 for braking the rotation of the sun gear 31 selectively. Moreover, a ring gear 32 acting as the output element of the auxiliary transmission unit 21 is connected to an intermediate shaft 33 acting as the input element of the main transmission unit 22.

In the auxiliary transmission unit 21, therefore, the planetary gear mechanism 29 rotates as a whole with the multi-disc clutch C0 or the one-way clutch F0 being applied, so that the intermediate shaft 33 rotates at the same speed as that of the input shaft 28, thus establishing a lower gear stage. With the brake B0 being applied to stop the rotation of the sun gear 31, moreover, the ring gear 32 is accelerated with respect to the input shaft 28 to establish a higher gear stage.

On the other hand, the main transmission unit 22 is equipped with three sets of planetary gear mechanisms 40, 50 and 60, which have their individual rotary elements connected, as follows. Specifically, a sun gear 41 of the first planetary mechanism 40 and a sun gear 51 of the second planetary mechanism 50 are integrally connected to each other. Moreover, a ring gear 43 of the first planetary mechanism 40, a carrier 52 of the second planetary mechanism 50 and a carrier 62 of the third planetary mechanism 60 are connected to one another, and an output shaft 65 is connected to the carrier 62 of the third planetary mechanism 60. In addition, the second planetary mechanism 50 has its ring gear 53 connected to a sun gear 61 of the third planetary mechanism 60.

The gear train of this main transmission unit 22 can set one reverse and four forward gear stages and is composed of the following clutches and brakes for that settings. Of these, the clutches will be described at first. A first clutch C1 is interposed between a ring gear 53 of the second planetary mechanism 50 and the sun gear 61 of the third planetary mechanism 60, which are connected to each other, and the intermediate shaft 33. Moreover, the second clutch C2 is interposed between the sun gear 41 of the first planetary mechanism 40 and the sun gear 51 of the second planetary mechanism 50, which are connected to each other, and the intermediate shaft 33.

Here will be described the brakes. A first brake B1 is a band brake which is arranged to stop the rotations of the sun gears 41 and 51 of the first and second planetary mechanisms 40 and 50. Between these sun gears 41 and 51 (i.e., the common sun gear shaft) and a casing 66, there are arrayed in series a first one-way clutch F1 and a second brake B2 which is a multi-disc brake. Of these, the first one-way clutch F1 is applied when the sun gears 41 and 51 are to rotate backward (of the opposite rotating direction of the input shaft 28). A third brake B3 which is a multi-disc brake is interposed between a carrier 42 of the first planetary mechanism 40 and the casing 66. Between a ring gear 63 of the third planetary mechanism 60 and the casing 66, there are arranged in parallel a fourth brake B4 which is a multi-disc brake for braking the rotation of the ring gear 63 and a second one-way clutch F2. Incidentally, this second one-way clutch F2 is applied when the ring gear 63 is to rotate backward.

Figure 4:
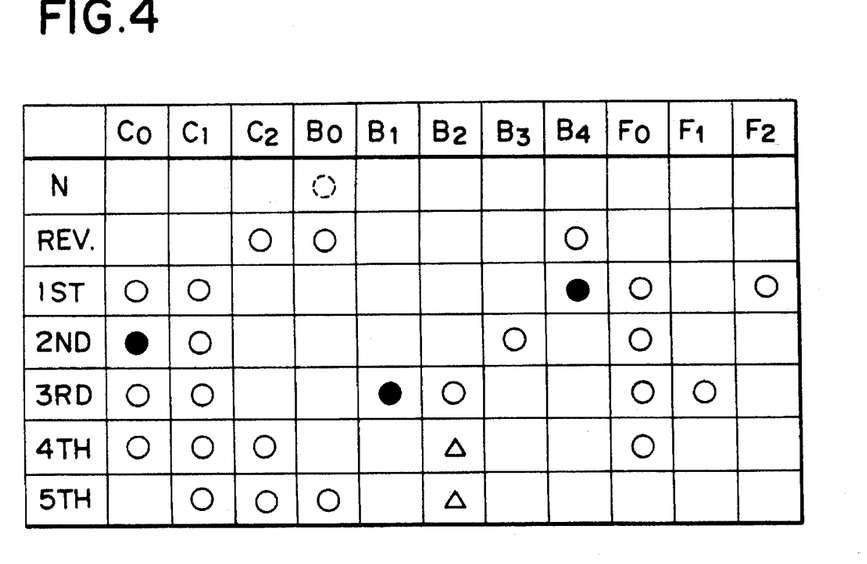
FIG. 4 is a clutch and application chart for setting individual gear stages.

The automatic transmission A thus far described can set five forward and one reverse gear stages by applying/releasing the individual clutches and brakes, as tabulated ill the clutch/brake application chart of FIG. 4. In FIG. 4: symbols ○ indicate the applied state; symbols ● indicate the applied state to be taken at the time of engine braking; symbols Δ indicate the applied or released state; and blanks indicate the released state.

Figure 5:
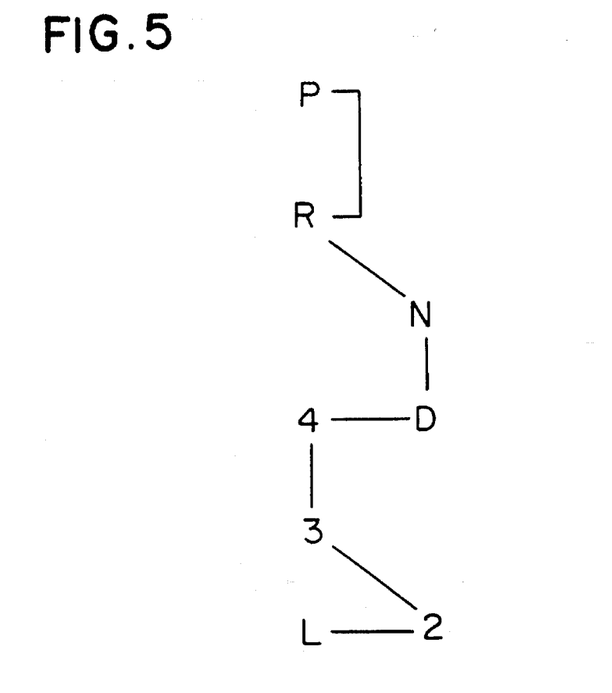
FIG. 5 is a diagram showing an array of shift positions for selecting individual running ranges.

The individual gear stages appearing in FIG. 4 are set according to the running ranges which are selected by operating the (not-shown) shift lever, and the positions of those running ranges to be selected by the shift lever are arrayed, as shown in FIG. 5. Specifically, the array is made such that a parking (P) range position is followed by a reverse (R) range position and such that a neutral (N) range position is arranged subsequent to the R-range but oblique to the array of the P-range and the R-range. A drive (D) range position is arranged subsequent to the N-range in parallel with the aforementioned array direction of the P-range position and the R-range position. Moreover, a 4th speed range position is subsequently arranged at a right angle with respect to the array direction of the N-range and the D-range. In addition, a 3rd speed range position is arranged subsequent to the 4th speed range position in parallel with the aforementioned array direction of the N-range and the D-range. Moreover, a 2nd speed range position is arranged to have a relation similar to that which is taken by the N-range relative to the aforementioned R-range position. Finally, a low (L) range position is arranged to have a relation similar to that which is taken by the 4th speed range position relative to the D-range position.

Of these running ranges: the D-range can establish the five forward gear stages; the 4th speed range can establish the four forward gear stages excepting the 5th speed or the overdrive gear stage; the 3rd speed range can establish the gear stages to the 3rd speed; the 2nd speed range can establish the gear stages to the 2nd speed; and the L-range can establish only the first speed. In case, therefore, the shift lever is manually operated between the 3rd speed range position and the 2nd speed range position, there is established either an upshift from the 2nd speed to the 3rd speed or a downshift from the 3rd speed to the 2nd speed.

As tabulated in the clutch/brake application chart of FIG. 4, the shifts between the 2nd speed and the 3rd speed are effected by the clutch-to-clutch shifts in which both the application and release of the second brake B2 and the third brake B3 are changed together. In order to smoothen these shifts, a hydraulic circuit shown in FIG. 6 is incorporated into the aforementioned hydraulic control unit 18.

Figure 6:
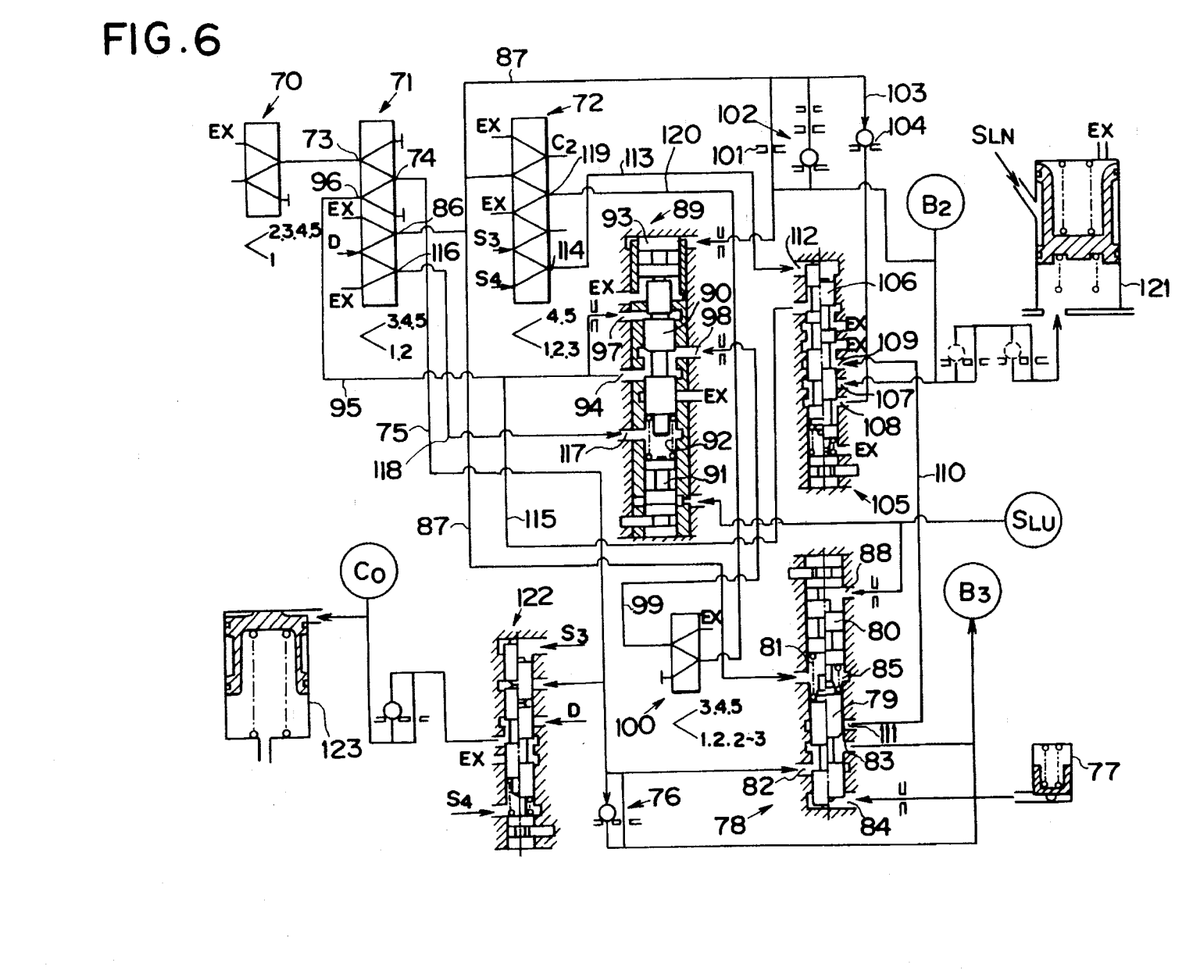
FIG. 6 is a diagram showing a portion of an oil pressure circuit.

In FIG. 6: reference numeral 70 designates a 1-2 shift valve; numeral 71 designates a 2-3 shift valve; and numeral 72 designates a 3-4 shift valve. These shift valves 70, 71 and 72 have their individual ports opened to have communications at the individual gear stages, as respectively enumerated below themselves. Incidentally, the numerals indicate the individual gear stages. Of the ports of the 2-3 shift valve 71, a brake port 74 to communicate with an input port 73 at the 1st and 2nd speeds is connected to the third brake B3 via an oil passage 75. This oil passage 75 is equipped with an orifice 76, and a damper valve 77 is connected between the orifice 76 and the third brake B3. The damper valve 77 sucks the oil pressure a little to perform its damping action in case the third brake B3 is abruptly fed with the line pressure.

Reference numeral 78 designates a B-3 control valve for controlling the engaging pressure of the third brake B3 directly. Specifically, the B-3 control valve 78 is equipped with a spool 79, a plunger 80 and a spring 81 sandwiched between the former two. An input port 82 to be controlled by the spool 79 is connected to the oil passage 75, and an output port 83 to be selectively caused to communicate with the input port 82 is connected to the third brake B3. The output port 3 is further connected to a feedback port 84 which is formed at the side of the leading end of the spool 79. On the other hand, a port 85 opened into a portion, in which the aforementioned spring 81 is arranged, is made to communicate with such one 86 of the ports of the 2-3 shift valve 71 via an oil passage 87 as outputs a D-range pressure at a 3rd or higher speed gear stage. Moreover, a control port 88 formed at the side of the end portion of the plunger 80 is connected with the lockup clutch linear solenoid valve SLU.

As a result, the B-3 control valve 78 has its regulated pressure level set by the elastic force of the spring 81 and the oil pressure fed to the port 85, so that its regulated pressure level rises to the higher value as the signal pressure fed to the control port 88 is the higher.

In addition, reference numeral 89 appearing in FIG. 6 designates a 2-3 timing valve which is constructed to include: a spool 90 formed with one radially smaller land and two radially larger lands; a first plunger 91; a spring 92 sandwiched between the former two; and a second plunger 93 arranged at the side opposed to the first plunger 91 across the spool 90. This 2-3 timing valve 89 has its intermediate port 94 connected to an oil passage 95, which in turn is connected to such a pore 96 of the 2-3 shift valve 71 as is caused to communicate with such the brake port 74 at a 3rd or higher speed gear stage. Moreover, the oil passage 95 is branched in its midway and connected through an orifice to a port 97 which is opened between the aforementioned smaller-diameter land and one of the larger-diameter lands.

A port 98 to be selectively caused to communicate with the port 94 at the intermediate portion is connected through an oil passage 99 with a solenoid relay valve 100. Moreover, the lockup clutch linear solenoid valve SLU is connected to the port which is opened in the end portion of the first plunger 91, and the second brake B2 is connected through an orifice to the port which is opened in the end portion of the second plunger 93.

The aforementioned oil passage 87 is provided for applying/releasing the oil pressure to and from the second brake B2 and is equipped in its midway with a smaller-diameter orifice 101 and an orifice 102 having a check ball. From this oil passage 81, there is branched an oil passage 103 which is equipped with a larger-diameter orifice 104 having a check ball to be opened when the second brake B2 is to be released. The oil passage 103 is connected with an orifice control valve 105, as will be described in the following.

This orifice control valve 105 controls a rate of releasing the pressure from the second brake B2. This second brake B2 is connected to a port 107 which is so formed in an intermediate portion as can be opened or closed by a spool 106 of the orifice control valve 105. The aforementioned oil passage 103 is connected to a port 108 which is formed below that port 107, as shown. A port 109 is formed above the port 107 connected with the second brake B2, as shown, and is selectively caused to communicate with a drain port. To that port 109, there is connected through an oil passage 110 a port 111 of the aforementioned B-3 control valve 78. Incidentally, this port 111 is selectively caused to communicate to the output port 83 which is connected with the third brake B3.

Of the ports of the orifice control valve 105, a control port 112 formed at the end portion opposed to the spring for urging the spool 106 is connected to a port 114 of the 3–4 shift valve 72. This port 114 outputs a signal pressure of the third solenoid valve S3 at a 3rd or lower speed gear stage and a signal pressure of the fourth solenoid valve S4 at a 4th or higher speed gear stage. With the orifice control valve 105, moreover, there is connected an oil passage 115 which is branched from the aforementioned oil passage 95 and which is selectively caused to communicate with the drain port.

Incidentally, in the aforementioned 2–3 shift valve 71, a port 116 for outputting a D-range pressure at a 2nd or lower speed gear stage is connected via an oil passage 118 to a port 117 which is opened in such a portion of the aforementioned 2–3 timing valve 89 as is arranged with the spring 92. In the 3–4 shift valve 72, moreover, a port 119, which is caused to communicate with the aforementioned oil passage 87 at a 3rd or lower speed gear stage, is connected through an oil passage 120 with the solenoid relay valve 100.

In FIG. 6, moreover: reference numeral 121 designates an accumulator for the second brake B2; numeral 122 designates designates a C-0 exhaust valve; and numeral 123 designates an accumulator for the clutch CO. Incidentally, the C-0 exhaust valve 122 applies the clutch CO so as to effect the engine braking only at the 2nd speed in the 2nd speed range.

According to the hydraulic circuit thus far described, therefore, if the port 111 of the B-3 control valve 78 is in communication with the drain, the engaging pressure to be fed to the third brake B3 at the time of setting the 2nd speed can be directly regulated by the B-3 control valve 78, and its regulated level can be varied by the linear solenoid valve SLU. If, on the other hand, the spool 106 of the orifice control valve 105 is in the position, as shown at the lefthand half in FIG. 6, the second brake B2 has communication with the oil passage 103 through that orifice control valve 105. As a result, the pressure can be released through the larger-diameter orifice 104 to control the rate of releasing the pressure from the second brake B2.

Figure 7:
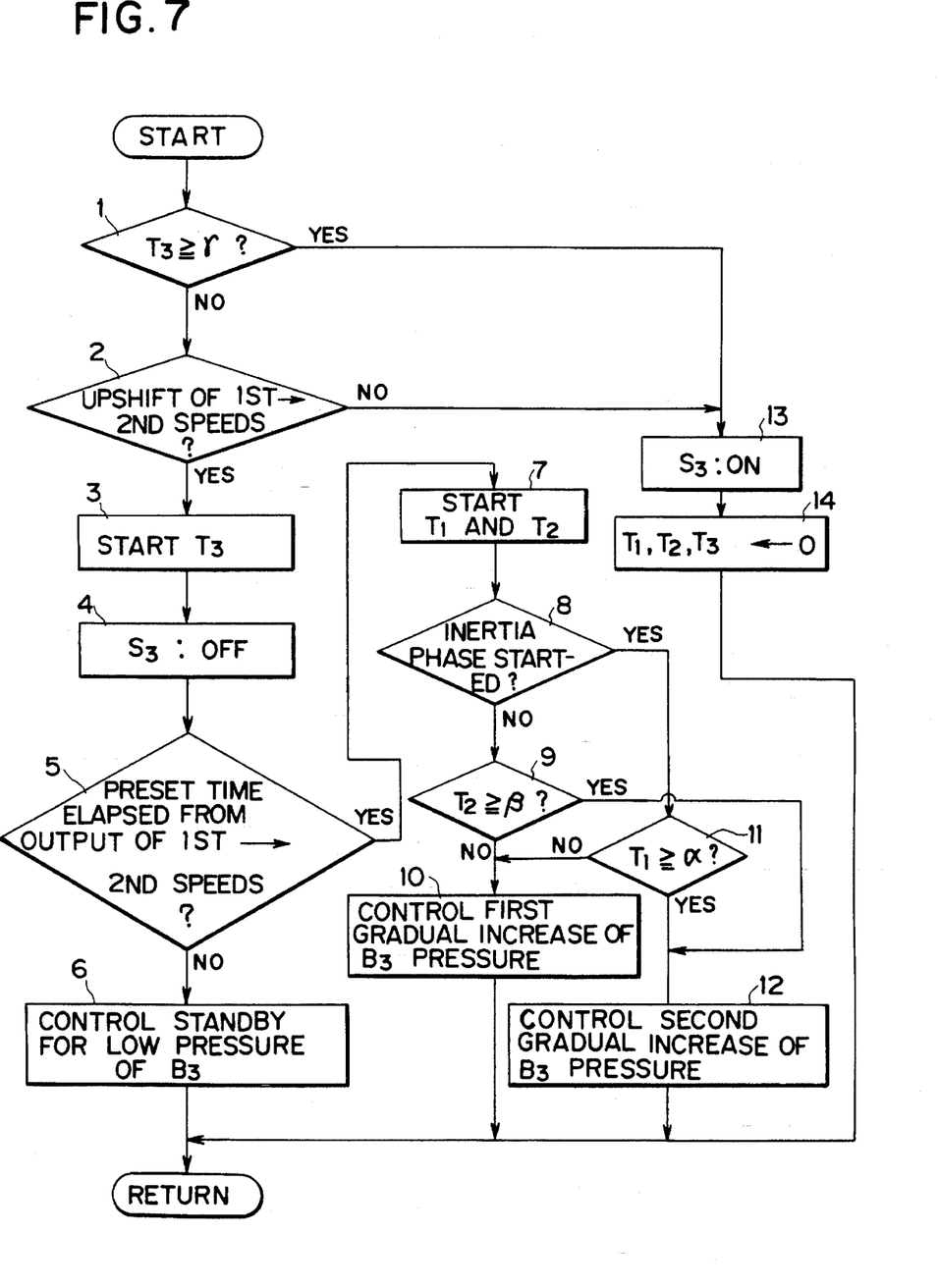
FIG. 7 is a flow chart showing a routine for controlling the engaging pressure of a third brake at the time of an upshift from 1st to 2nd speeds.
Figure 8A:
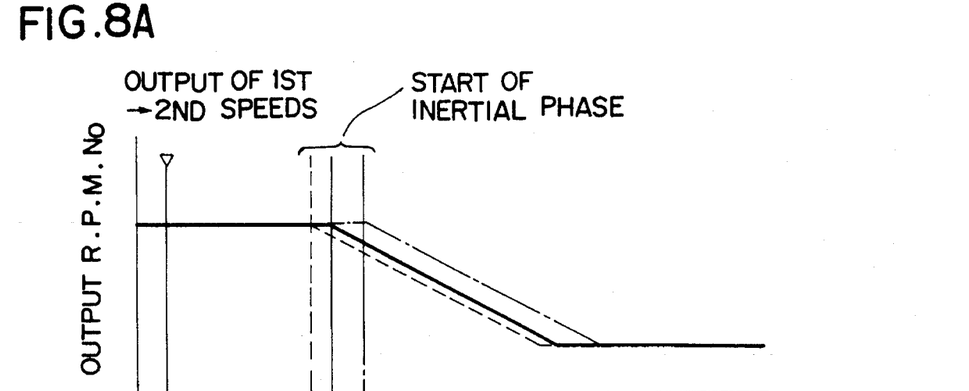
FIG. 8 is a time chart plotting the changes in an output R.P.M., an output torque, a command value and output pressure of a linear solenoid valve, and an engaging pressure of a third brake in case the control routine shown
Figure 8B:
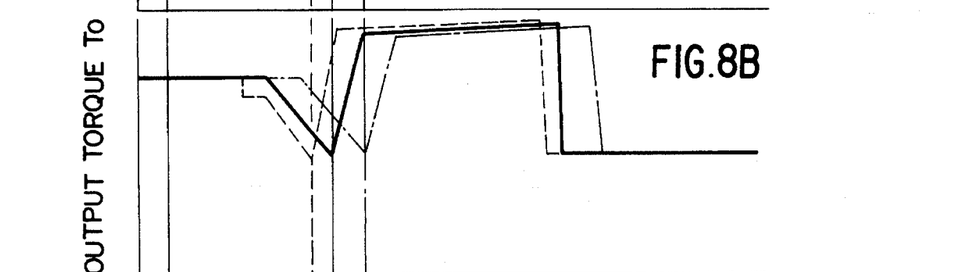
Figure 8C:
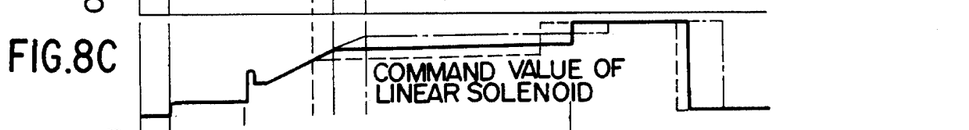
Figure 8D:
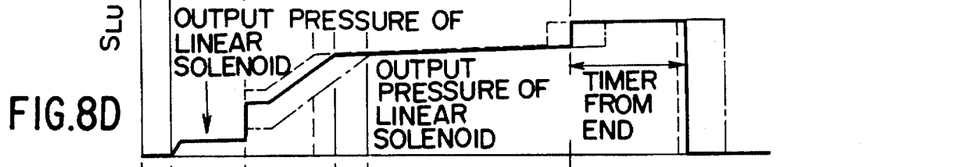
Figure 8E:
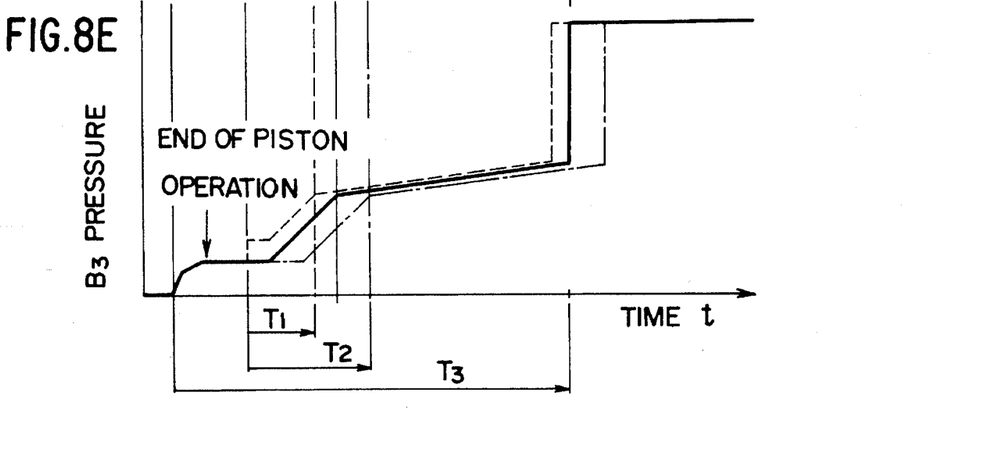

The third brake B3 is applied at the 2nd speed, as can be seen from the clutch/brake application chart of FIG. 4. This engaging pressure is directly controlled by the B-3 control valve 78. FIG. 7 is a flow chart showing a routine for controlling the engaging pressure of the third brake B3 in the case of an upshift from the 1st speed to the 2nd speed.

At first Step 1, it is decided whether or not a third timer T3 or a guard timer has counted up a predetermined time period τ. Since not only this third timer T3 but also first and second timers T1 and T2, as will be described in the following, have their initial values set to "0", the first answer of Step 1 is "NO", and the routine advances to Step 2. At Step 2, it is decided whether or not an upshift of 1st to 2nd speeds is being executed. If the answer is "YES", the third timer T3 is started (at Step 3), and the third solenoid valve S3 is turned OFF (at Step 4). This third solenoid valve S3 is normally closed to issue a signal pressure in its OFF state. As a result, the aforementioned orifice control valve 105 has its control port 112 fed with a signal pressure from the third solenoid valve S3 through the 3–4 shift valve 72 and the oil passage 113, so that its spool 106 is pushed down to the position, as shown at the righthand half in FIG. 6, to cause its port 109 to communicate with the drain port. This port 109 is connected to the port 111 of the B-3 control valve 78 so that the latter port 111 has communication with the drain. As a result, the B-3 control valve 78 comes into a state in which its pressure can be regulated.

At subsequent Step 5, it is decided whether or not a predetermined time period has elapsed from the upshift output from the 1st to 2nd speeds. The time period to be referred to for this decision is preset sufficient for ending the operation of the (not-shown) piston of the third brake B3. If the answer is "NO", a control of the standby of a low-pressure standby of the third brake B3 is executed at Step 6. This corresponds to the control corresponding to the function of the low-pressure standby means in the present invention. Specifically, this control lowers the regulated pressure level of the B-3 control valve 78 so that the engaging pressure to be fed to the third brake B3 may be set to a level as low as to move only the piston. In the hydraulic circuit shown in FIG. 6, the signal pressure of the linear solenoid valve SLU pushes the spool 80 in the same direction as the spring 81 so that the signal pressure is set to a level lower than the elastic force of the spring 81 thereby to determine the :regulated pressure level exclusively by the elastic force of the spring 81. As a result, no surge occurs because the oil pressure being fed is at a low level even if the piston of the third brake B3 reaches its stroke end during the control of that low-pressure standby.

If the answer of Step 5 is "YES" as a result that the control of the low-pressure standby is continued for the predetermined time period, the first and second timers T1 and T2 are started at Step 7. It is then decided (at Step 8) whether or not the inertial phase has been started. Here, the first timer T1 prevents the gentle boosting control (i.e., the second gradual increase control) of the following engaging pressure (i.e., the pressure of B3) from being prematurely started on the basis of an erroneous detection of the inertial phase. On the other hand, the second timer T2 is a guard timer for determining the end period of the control (i.e., the first gradual increase control) for boosting the engaging pressure quickly. On the other hand, the decision of Step 8 can be executed on the basis of the three factors, i.e., the turbine R.P.M., the output shaft R.P.M. and the speed ratio. In other words, the operation of Step 8 corresponds to the means for detecting the start of the inertial phase.

If the inertial phase is not started yet so that the second timer T2 has not counted up a predetermined time period β, that is, if the answer of Step 9 is "NO", the first gradual increase control of the engaging pressure (i.e., the pressure of B3) is executed. This is a control for shortening the response delay of the shift as much as possible by feeding the oil pressure quickly to the third brake B3. For this control, the output signal pressure of the linear solenoid valve SLU is raised at first to such a level as can regulate the engaging pressure. Specifically, the linear solenoid valve SLU is so controlled that the product of the signal pressure and the pressure receiving area of the plunger 88 may exceed the elastic force of the spring 81. In this control, the command signal from the electronic control unit 19 to the linear solenoid valve SLU has its value overshot temporarily so as to improve the responsiveness of the linear solenoid valve SLU.

From this state, the signal pressure, i.e., the regulated pressure level is raised to increase the engaging pressure to be fed to the third brake B3 at a considerably steep gradient. This boosting control is executed when the piston ends its operation, to establish little oil flow. Because of a small effective area of the B-3 control valve 78, moreover, there arises no surge. Incidentally, the rising gradient of the engaging pressure at this first gradual increase control may preferably be determined according to a running state, as dictated by the vehicle speed, the throttle opening or the input torque. For example, the boosting gradient is increased the steeper for the higher input torque or the larger throttle opening.

If the start of the inertial phase is detected during that first gradual increase control, the answer of Step 8 is "YES". Then, the routine advances to Step 11, at which it is decided whether or not the first timer T1 has ended counting of a predetermined time period α (<β). If this answer is "NO", the routine advances to Step 10 at which the aforementioned first gradual increase control is continued, because time first timer T1 prevents the first gradual increase control from being prematurely ended on the basis of the erroneous detection of the inertial phase. On the contrary, if the first timer T1 has ended counting of the predetermined time period α, that is, the answer of Step 11 is "YES", the second gradual increase control of the engaging pressure (i.e., the pressure of B3) is executed (at Step 12).

This is a control for improving the shifting shock by gentling the rise of the engaging pressure of the third brake B3 and is effected by making the increasing tendency of the signal pressure of the linear solenoid valve SLU gentler than the preceding one. Incidentally, The rising gradient of the engaging pressure of this case may preferably be determined according to the running state dictated by the vehicle speed, the throttle opening or the input torque, as in the case of the first gradual increase control. For example, the pressure rising gradient is made the steeper for the higher input torque and the larger throttle opening.

After the start of the aforementioned second gradual increase control, the engaging pressure is temporarily lowered at the end period of the shift. Thus, the shifting shock is further improved. When the shift is ended, the answer of Step 2 is "NO". This decision can be executed on the basis of the three, i.e., the turbine R.P.M. or the engine R.P.M., the output R.P.M. and the speed ratio. When the shift is ended, the routine advances to Step 13, the third solenoid valve S3 is turned ON. The third solenoid valve S3 is normally closed, as described before, to open the drain port, when it is turned ON, so that it does not output the signal pressure. As a result, no oil pressure is applied to the control portion of the aforementioned orifice control valve 105 so that the spool 106 is pushed up to the position, as shown at the lefthand half in FIG. 6, to close the port 109. Specifically, the B-3 control valve 78 has its port 111 closed so that it quits its pressure regulating action. Simultaneously with this, the spool 79 is fixed in the position, as shown at the lefthand half in FIG. 6. As a result, the input port 82 and the output port 83 come into the state, in which they are always in communication with each other, so that the line pressure PL is fed as it is to the third brake B3. Thus, the third brake B3 is applied without fail to provide a high reliability. At final Step 14, the individual timers T1, T2 and T3 are cleared.

Incidentally, if the end of the shift is not detected due to a failure of the rotation sensor or the like or if the shift end is not detected even after lapse of the predetermined time period τ of the third timer T3 because the shift cannot be executed due to a failure of the pressure regulating valve or the like, the answer of Step 1 is "YES". In this case, the routine advances directly to Step 13, at which the third solenoid valve S3 is turned ON to forcibly end the pressure regulation by the B-3 control valve 78. After this, the individual timers T1, T2 and T3 are cleared.

FIG. 8 plots the changes of the output R.P.M. No., the output torque To, the command value and signal pressure of the linear solenoid valve SLU, and the engaging pressure of the third brake B3 in case the engaging pressure of the third brake B3 is controlled at the time of the upshift from the 1st to 2nd speeds. In FIG. 8: the normal states are indicated by solid lines; the higher signal pressures of the linear solenoid valve SLU are indicated by broken lines; and the lower signal pressures are indicated by single-dotted lines. Since the oil pressure to be fed to the third brake B3 is kept at the lower pressure till the end of the operation of the piston of the third brake B3, as is apparent from FIG. 8, and the engaging pressure is raised, so that its surge is not caused. Moreover, the aforementioned first gradual increase control is executed so that the responsiveness of the shift is improved.

Incidentally, the present invention should not be limited to the foregoing embodiment but can also be applied to a shift control system for an automatic transmission other than not only that having the gear train shown in FIG. 3 and but also that having the hydraulic circuit shown in FIG. 6.

Here will be summarized the advantages to be obtained by the present invention. According to the shift control system of the present invention, when the engaging pressure for applying the frictional engagement means is to be controlled directly by the pressure regulator valve, it is kept at such a low level at the beginning of its feed as can allow only the piston to move and is gradually raised after lapse of a predetermined time period. As a result, an excessive amount of oil is not fed even when the piston reaches its stroke end. Thus, the surge of the engaging pressure can be prevented to eliminate the deterioration of the shifting shock without fail.

If, moreover, the pressure regulating valve is exemplified by a valve for setting the regulated pressure level in accordance with the elastic force of an elastic member such as a spring and the regulated pressure level, the lower-pressure state at the beginning of the feed of the engaging pressure can be set by the elastic force of the elastic member so that the regulated pressure level can be easily set in a high control accuracy.

Still moreover, if the pressure raising gradient is made high before the start of the inertial phase and low after the same, the shift can be effected in high responsiveness.

What is claimed is:

1. A shift control system for an automatic transmission including frictional engagement means to be applied by actuating a piston by an oil pressure, comprising:

a pressure regulating valve for regulating the oil pressure to be fed to said frictional engagement means and for controlling the regulated pressure:

shift detecting means for detecting a shift to be executed by feeding the oil pressure to said frictional engagement means; low-pressure standby means for setting the regulated pressure level during a predetermined time period after said shift has been detected that the oil pressure to be fed to said frictional engagement means moves only said piston;

booster means for controlling the regulated pressure level so that the oil pressure to be fed to said frictional engagement means may gradually increase only after lapse of said predetermined time period; and means for detecting the start of an inertial phase during said shift, wherein said booster means controls the regulated pressure level so that an increasing gradient of the oil pressure to be fed to said frictional engagement means may be different before and after the start of the inertial phase.

2. A shift control system according to claim 1, wherein said booster means includes oil pressure increasing gradient changing means for increasing the increasing gradient of said oil pressure before the start of said inertial phase is detected but decreasing the same thereafter.

3. A shift control system according to claim 2, wherein said oil pressure increasing gradient changing means includes means for changing the increasing gradient of said oil pressure on the basis of data of at least one of a vehicle speed, a throttle opening and an input torque to said automatic transmission.

4. A shift control system according to claim 1, further comprising timer means for outputting no detection signal of the start of said inertial phase before lapse of a predetermined time period after said shift has been commanded.

5. A shift control system according to claim 1, further comprising timer means for outputting a detection signal of the start of said inertial phase unless said means for detecting the start of said inertial phase outputs its detection signal after lapse of a predetermined period after said shift has been commanded.

6. A shift control system according to claim 1, wherein said booster means includes overshoot means for raising said oil pressure temporarily at the boosting time when said oil pressure is to be raised at a high increasing gradient before the start of said inertial phase is detected.

7. A shift control system for an automatic transmission including frictional engagement means to be applied by actuating a piston by an oil pressure, comprising:

a pressure regulating valve for regulating the oil pressure to be fed to said frictional engagement means and for controlling the regulated pressure level;

shift detecting means for detecting a shift to be executed by feeding the oil pressure to said frictional engagement means;

low-pressure standby means for setting the regulated pressure level of said pressure regulator valve to such a value during a predetermined timer period after said shift has been detected that the oil pressure to be fed to said frictional engagement means moves only said piston; and booster means for controlling the regulated pressure level so that the oil pressure to be fed to said frictional engagement means may gradually increase after lapse of said predetermined time period, wherein said pressure regulator valve includes an elastic member for setting the regulated pressure level and a signal pressure input unit for changing the regulated pressure level, and wherein said low-pressure standby means feeds said signal pressure input unit with a signal pressure equal to or lower than the elastic force of said elastic member for said predetermined time period.

8. A shift control system for an automatic transmission including frictional engagement means to be applied by actuating a piston by an oil pressure, comprising:

a pressure regulating valve for regulating the oil pressure to be fed to said frictional engagement means and for controlling the regulated pressure level;

shift detecting means for detecting a shift to be executed by feeding the oil pressure to said frictional engagement means;

low-pressure standby means for setting the regulated pressure level of said pressure regulator valve to such a value during a predetermined timer period after said shift has been detected that the oil pressure to be fed to said frictional engagement means moves only said piston; and booster means for controlling the regulated pressure level so that the oil pressure to be fed to said frictional engagement means may gradually increase after lapse of said predetermined time period, wherein said pressure regulator valve includes: a valve member adapted to be axially pushed by the oil pressure to be fed to said frictional engagement means; a drain port adapted to be opened or closed by said valve member for selectively draining the oil pressure to be fed to said frictional engagement means; an elastic member for pushing said valve member in a direction to close said drain port; a plunger arranged movably at the side opposed to said valve member across said elastic member; and a signal pressure input unit formed at the side opposed to said valve member across said plunger.

9. A shift control system according to claim 8, further comprising:

shift end deciding means for deciding the end of said shift; and fixation means for fixing said valve member in a state to close said drain port when the end of said shift is decided.

10. A shift control system according to claim 9, wherein said fixation means includes a valve mechanism for feeding an oil pressure selectively between said valve member and said plunger.

11. A shift control system according to claim 9, wherein said shift end deciding means includes timer means for commanding the end of said shift a predetermined time period after the command of said shift.

12. A shift control system according to claim 8, further comprising means for selectively shutting the drainage of the oil pressure from said drain port.

13. A shift control system according to claim 8, further comprising a valve connected with said signal pressure input unit for changing its output signal pressure continuously.

14. A shift control system according to claim 13, wherein said valve includes a linear solenoid valve.

15. A shift control system according to claim 13, wherein said low-pressure standby means includes means for setting the signal pressure to such a level that the force for pushing said plunger in response to said signal pressure may be equal to or lower than the elastic force of said elastic member, and wherein said booster means includes means for setting the signal pressure to such a level that the force for pushing said plunger in response to said signal pressure may be higher than the elastic force of said elastic member.

\* \* \* \* \*